United States Patent

Furst et al.

[15] 3,700,702

[45] Oct. 24, 1972

[54] NEW 15β,16β-METHYLENE STEROIDS

[72] Inventors: Andor Furst, Basel; Marcel Muller, Frenkendorf; Peter Muller, Arlesheim; Arno Johannes Schocher, Benken; Elisabeth Becher, Basel, all of Switzerland

[73] Assignee: Hoffmann-La Roche Inc., Nutley, N.J.

[22] Filed: Dec. 2, 1970

[21] Appl. No.: 94,585

[52] U.S. Cl.......260/397.45, 260/239.55 R, 260/999
[51] Int. Cl..............................................C07c 169/32
[58] Field of Search ......./Machine Searched Steroids

[56] References Cited

UNITED STATES PATENTS

| 3,338,928 | 8/1967 | Beard et al. | 260/397.4 |
| 3,365,446 | 1/1968 | Cross et al. | 260/239.55 |
| 3,438,975 | 4/1969 | Edwards | 260/239.55 |
| 3,470,160 | 9/1969 | Schmidt et al. | 260/239.55 |
| 3,528,999 | 9/1970 | Bladon | 260/397.3 |

*Primary Examiner*—Henry A. French
*Attorney*—Samuel L. Welt, Jon S. Saxe, Bernard S. Leon, William H. Epstein and George M. Gould

[57] ABSTRACT

A new series of 15β,16β-methylene pregnanes is disclosed and methods for their preparation are described. The compounds are particularly useful as antiinflammatory agents.

12 Claims, No Drawings

NEW 15β,16β-METHYLENE STEROIDS

BRIEF DESCRIPTION OF THE INVENTION

This invention is concerned with novel steroids of the general formula

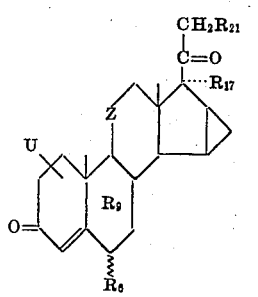

I wherein $R_6$ and $R_9$ are independently hydrogen, fluorine, chlorine or bromine; $R_{17}$ and $R_{21}$ are independently hydroxy or lower acyloxy; Z is carbonyl or β-hydroxymethylene and U is a single or double bond between C—1 and C—2.

An acyloxy group is defined as the residue of an aliphatic, cyloaliphatic, arylaliphatic or aromatic carboxylic acid containing from one to 20 carbon atoms. Examples of such acids are formic acid, acetic acid, propionic acid, pivalic acid, butyric acid, caproic acid, enanthic acid, oleic acid, palmitic acid, stearic acid, succinic acid, malonic acid, citric acid, benzoic acid, phenylacetic acid, cyclohexylacetic acid, etc.

Preferred compounds of formula I are those in which $R_6$ and $R_9$ are hydrogen or fluorine, $R_{17}$ and $R_{21}$ are hydroxy or acetoxy and Z is β-hydroxymethylene.

Compounds of formula I wherein Z is hydroxymethylene may be prepared from compounds of formula II by hydroxylation as shown in Reaction Scheme A.

REACTION SCHEME A

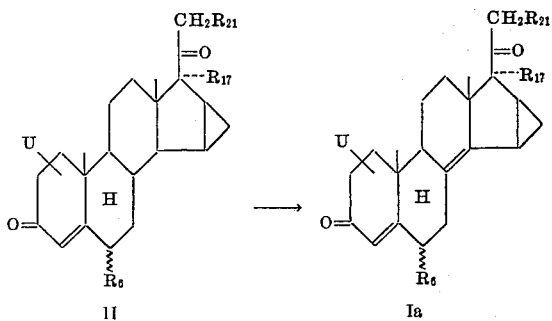

where $R_6$, $R_{17}$ $R_{21}$ and U are as above.

This hydroxylation can employ microbiological procedures generally used for the introduction of an 11β-hydroxy group in steroids. Microorganisms that can be used are the taxonomic classes of fungi and Schizomycetes, especially the subclasses Ascomycetes, Phycomycetes, Basidiomycetes and Actinomycetales. The reaction can also be carried out by utilizing physically or chemically produced mutants of these microorganisms. Cell-free enzyme preparations of the aforesaid microorganisms or mutants may also be used in a manner known per se.

The compounds of formula Ia may be converted to the remaining compounds of the genus within the formula I by a multiplicity of reaction schemes. Before describing the various reaction schemes, a number of general comments will be made regarding the various transformations and interconversions that can be carried out at almost any stage of these reaction schemes.

If one desires to prepare compounds of formula I wherein U is a double bond, the double bond can be introduced at any stage of the reaction scheme. It is preferable, however, that the double bond introduction be accomplished as late as possible in the reaction scheme to allow for more flexibility, particularly with regard to the introduction of protective groups in the 3-position and the introduction of a halogen at C—6. The 1, 2-dehydrogenation can be accomplished, for example, by known microbiological methods or by chemical dehydration techniques employing such dehydration agents as iodine pentoxide, periodic acid, selenium dioxide, 2, 3-dichloro-5, 6-dicyanobenzoquinone, chloranil or lead tetraacetate in a manner known per se.

Compounds of formula Ia can be readily converted to compounds of formula I were Z is carbonyl by standard oxidation procedures known in the art, such as for example, chromic acid oxidation with Jones Reagent. Where $R_{17}$ and/or $R_{21}$ is hydroxyl, such hydroxyl groups should be protected before oxidation as their esters, or where $R_{17}$ and $R_{21}$ are both hydroxyl, a bismethylenedioxy (BMD) derivative can be formed by the standard condensation with formaldehyde.

Where the reverse transformation is desired, i.e. the conversion of the C—11 carbonyl to a C—11 β-hydroxyl function, such reduction can be accomplished by standard procedures known in the art, such as, for example reduction with a complex metal hydride such as lithium aluminum hydride, sodium borohydride, diisobutyl aluminum hydride, and the like. Any other ketone groups present in the starting material should be protected before this reduction is carried out. Such protection can be accomplished, for example, by formation of ketals at C—3 and C—20 by standard procedures known in the art. The C—3 carbonyl group can also be protected by converting it to an enol ether by standard procedures. When $R_{17}$ and $R_{21}$ are both hydroxyl, the C—20 carbonyl can be protected as its BMD derivative.

The acylation of hydroxyl groups at C—17 and C—21 is accomplished by standard procedures. The C—21 hydroxyl group can be acylated by treatment with an acid chloride or acid anhydride in the presence of a base such as pyridine. The C—17 hydroxyl group is conveniently acylated by treatment with an acid chloride or acid anhydride in the presence of a strong acid catalyst such as p-toluenesulfonic acid.

The acyl group at C—17 or C—21 can be saponified by treatment, for example, with aqueous methanolic potassium carbonate or potassium hydroxide solution.

Compounds of formula Ia can be converted to compounds of formula Ib and formula Ic, wherein $R_6$, $R_{17}$, $R_{21}$ and U are as above and $R_9'$ is chlorine or bromine, by Reaction Scheme B below.

REACTION SCHEME B

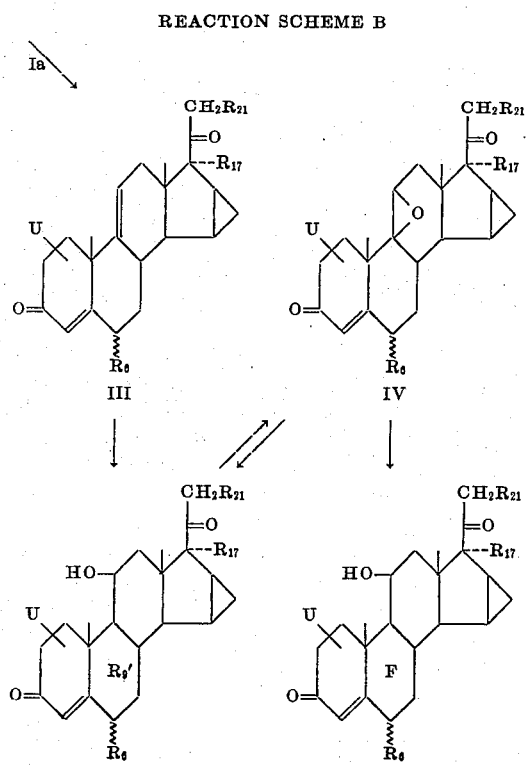

where $R_6$, $R_{17}$, $R_{21}$ and N are as above and $R_9'$ is chlorine or bromine.

First, compound Ia is converted to the 9, 11-dehydro derivative, formula III, by a two-step process involving formation of a sulfonate ester of the C—11 hydroxyl group and its subsequent elimination. The sulfonate esters are formed in a manner known per se. Suitable sulfonate esters include mesylates, tosylates, and the like. The elimination of the esters is conveniently done by contacting the ester with alumina for a certain length of time. It should be noted that $R_{21}$ cannot be a hydroxyl group for this process and should be suitably protected as an ester or a BMD derivative. Compound III is then converted to the halohydrin of formula Ib by treatment with hypochlorous or hypobromous acid or a combination of reagents which produces such acids, such as the combination of N-bromoacetamide and strong acid or N-chloro-succinimide and a strong acid.

If one desires a compound of formula Ic, i.e. a compound with a 9α-fluoro group, such a compound can be produced in two steps from compounds of formula Id. In such a process, the halohydrin, of formula Ib is treated with an anhydrous base such as for example anhydrous sodium acetate, to afford the epoxide of formula IV. The epoxide can then be opened to the desired compound Ic with anhydrous hydrogen fluoride. Of course, the epoxide IV can also be converted back to compounds of formula Ib with treatment with anhydrous hydrogen chloride or hydrogen bromide.

Reaction Scheme C below depicts the conversion of compounds of formula Id to compounds of formula Ie.

REACTION SCHEME C

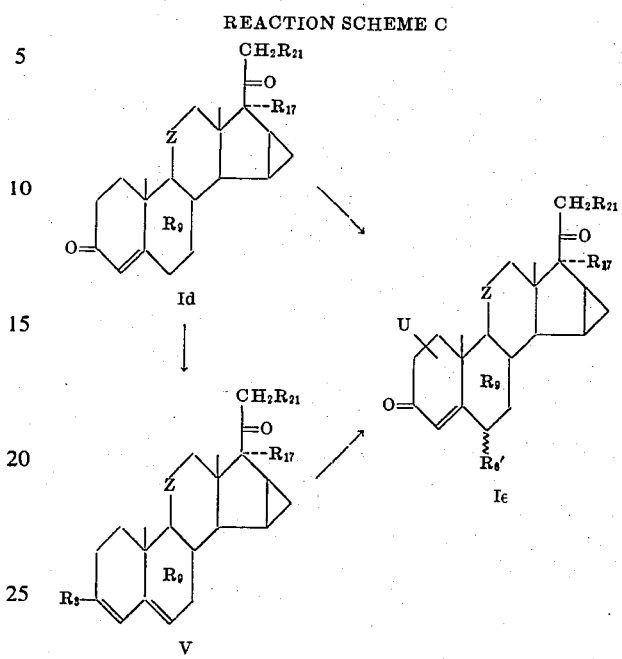

where $R_9$, $R_{17}$, $R_{21}$, Z and U are as above
$R_6'$ is fluorine, chlorine or bromine and $R_3$ is lower alkoxy or lower acyloxy.

The halogenation reaction can be carried out by treating a compound of formula Id with a chlorinating or brominating agent such as an N-chloro or N-bromo imide, for example, N-chlorosuccinimide or N-bromosuccinimide, or by treatment with elementary chlorine or bromine. It is generally preferred, however, to first form an enol ester or enol ether at C—3 and then treat said enol ester or enol ether, compound V, wherein $R_3$ is lower alkoxy or lower acyloxy, with one of the above halogenating agents or, in the case of the introduction of a fluorine, with perchloryl fluoride. In the case of the formation of an enol ester, hydroxyl groups at C—17 and C—21, but not at C—11, will be esterified. All of these reactions are performed by normal methods known in the art. In the course of these reactions, any intermediate products such as, for example, a 5α-hydroxy, 6β-halo or 5α, 6β-dihalo compound which may be isolated, can be converted to the desired compound of formula Ie by standard techniques of dehydration and dehydrohalogenation, respectively. The dehydration reaction can be carried out by treatment with a strong acid, such as hydrochloric acid. The dehydrohalogenation reaction can be carried out by reacting said 5, 6-dihalo steroid with an organic base such as pyridine.

If it is desired to obtain a compound of formula Ie wherein U is a double bond, it is preferred to introduce said double bond after the halogenation procedure.

The steroids of the present invention are especially useful as anti-inflammatory agents. For example, 3 mg. of 11β, 17α, 21-trihydroxy-15, 16β-methylene-pregna-1, 4-diene-3, 20-dione in oral administration and 10 mg. of 11β, 17α, 21-trihydroxy-15, 16β-methylene-pregn-4-en-3, 20-dione in subcutaneous administration in a rat shows granulation-inhibiting effects in the felt pellet test.

The products of this invention can be used as medicaments in the form of pharmaceutical preparations in which they are mixed with inert carrier materials suitable for enteral, parenteral and subcutaneous applications, such as, for example, water, gelatin, gum arabic, lactose, starch, magnesium, stearate, talc, vegetable oil, polyalkylene glycol, vaseline, and so forth.

The dosage of the useful compounds of this invention should be adjusted to individual needs although a dosage range of 5 mg per day to 30 mg per day for enteral application; 10 mg per day to 100 mg per day for topical application in the adult is recommended. Dosages can be administered in unit or divided dosage forms.

The pharmaceutical preparations can be in solid form, for example as tablets, dragees, suppositories, or capsules; in semisolid form, for example as salve; or in liquid form, for example as solutions, suspensions or emulsions. Such preparations can be sterilized and can contain additional materials, such as preservatives, stabilizers, wetting agents, emulsifiers, salts for changing the osmotic pressure, or buffers. The preparations can also contain other therapeutically useful materials.

In the Examples which follow all temperatures are expressed in Degrees Centigrade.

EXAMPLE 1

An agar slant containing 5 percent oatmeal and 2 percent agar in distilled water was incubated eight days at 22°with Coniothyrium hellebori Cooke and Massee CBS 159.58. An Erlenmeyer flask provided with a baffle and containing 100 ml. of a nutrient medium containing 2 percent sucrose, 0.3 percent yeast extract 0.1 percent sodium nitrate, 0.1 percent glycine, 0.1 percent primary potassium phosphate, 0.05 magnesium sulfate heptahydrate, 0.05 percent potassium chloride and 0.001 percent ferrous sulfate heptahydrate in distilled water was inoculated with the above culture. The medium was sterilized prior to the inoculation, the pH after the sterilization was about 5.1. This shaking culture was incubated for 40 hours at 22°.

A small fermenter with 8 l. of nutrient medium of the same composition as that used for the shaking culture above, was sterilized and inoculated with the contents of a shaking flask. The incubation was carried out for 48 hours, under stirring at 22° while aerated with 3 to 4 l. per minute. Then a solution of 17α, 21-dihydroxy-15, 16β-methylene-pregn-4-en-3,20-dione in 120 ml. acetone was added. The progress of the fermentation was followed by removing aliquots of the fermentation solution and extracting them with ethylacetate and analyzing by thin layer chromatography. The fermentation was ended after about 86 hours.

The mycelium masses were separated from the supernatant liquid by centrifugation of the fermentation mixture. The mycelia were twice suspended in a liter of water and filtered. The supernatant broth and the washings were extracted three times with 5 liters of methylenechloride for 15 minutes each. The combined extracts were dried over sodium sulfate and were evaporated under reduced pressure. The crude extract thus obtained was chromatographed on 120 g. silica gel. Benzene-acetone (4:1) eluted pure 11β,17α,2117 α-trihydroxy-15,16β-methylene-pregn-4-en-3,20-dione which, after crystallization from acetone melted at 219° to 221°, $[\alpha]_D^{25} = +120°$, uv: $\epsilon_{240} = 16400$.

EXAMPLE 2

An agar slant containing 0.15 percent meat extract, 0.6 percent peptone, 0.3 percent yeast extract and 2 percent agar in tap water was inoculated with Corynebacterium simplex ATTC 6946 and was incubated for 2 days at 28°. An Erlenmeyer flask provided with a baffle and containing 100 ml. of a nutrient medium containing 0.1 percent yeast extract in 1/15 molar phosphate buffer (pH 7) was inoculated with the above culture. The medium was sterilized prior to the inoculation and the shaking culture was incubated for 24 hours at 28°.

Erlenmeyer flasks which contain 100 ml. of nutrient medium of the same composition as for the shaking cutures were inoculated with 2 percent of the above culture. This was incubated for 24 hours at 28° on the shaker and then a solution of 25 mg./percent 11α,17β,21-trihydroxy-15,16β-methylene-pregn-4-en-3,20-dione in 1 ml. dimethylformamide was added. The fermentation was ended after 15 hours. The contents of the shaking flask were combined and were extracted 4 times with an equal volume of ethylacetate. The combined extracts were dried over sodium sulfate and the solvent was removed under reduced pressure. The crude product obtained from 10 shaking flasks was chromatographed on 40 g. silica gel. Benzene-acetone (3:1) eluted pure 11β,17,21-trihydroxy-15,16β-methylene-pregna-1,4-dien-3,20-dione, melting 176°–180° (from acetone-hexane), $\epsilon_{243} = 15300$.

EXAMPLE 3

2.4 g. 21-Acetoxy-9,11β-epoxy-17α-hydroxy-15,16 β-methylene-pregn-4-en-3,20-dione was dissolved in 100 ml. methylenechloride. The solution was treated with 12 g. of anhydrous hydrogen fluoride in 20 ml. tetrahydrofuran at −60°. The reaction mixture was kept at −60° for 1 hour and then at 0° for 24 hours. It was then poured into ice-cold sodium bicarbonate solution and extracted with methylenechloride. The extract was worked up and the material thus obtained was heated on a steam bath with 20 ml. of pyridine and 10 ml. of acetic anhydride for 30 minutes. The reaction mixture was evaporated under reduced pressure and the residue was chromatographed on a 50-fold quantity of silica gel with methylene chloride-acetone. The fractions which were uniform by thin layer chromatographic analysis were combined and were crystallized from acetone-hexane to afford 21-acetoxy-9α-fluoro-11β,17α-dihydroxy-15,16β-methylene-pregn-4-en-3,20 -dione, $\epsilon_{239} = 15600$.

The starting material can be prepared as follows:

A mixture of 375 mg. 11β,17α,21-trihydroxy-15,16β-methylene-pregn-4-en-3,20-dione, 10 ml. pyridine and 10 ml. acetic anhydride was kept for 16 hours at room temperature. The mixture was then evaporated under reduced pressure, taken up in toluene and again taken to dryness. The crude 21-acetate so obtained was dissolved in 5 ml. dimethylformamide, 0.2 ml. pyridine and 0.2 ml. methane sulfonyl chloride were added, and the mixture was heated for 2 hours at 100°. It was then poured into cold sodium bicarbonate solution and extracted with methylene chloride-ether. Work up of the organic extracts afforded a crude product which was chromatographed on silica gel. In this manner, 21-acetoxy-17α-hydroxy-15,16β-methylene-pregna-4,9(11)-dien-3, 3,20-dione was obtained m.p. 220° (from acetone-hexane), UV: $\epsilon_{239} = 17300$.

To a solution of 3.98 g. of the above described diene in 80 ml. dioxane was added 3 ml. 0.5N perchloric acid and over 30 minutes 1.65 g. N-bromoacetamide in 3 portions. The reaction mixture was stirred for 5 hours and poured into 2 ml. of 5 percent sodium bicarbonate solution. After methylene chloride extraction there was obtained from the extracts, 21-acetoxy-9α-bromo-11β,17α15,16β-methylene-pregn-4-en-3,20-dione.

The bromohydrin so obtained was dissolved in 300 ml. acetone and the solution was heated with 8 g. of anhydrous sodium acetate for 7 hours at reflux. The solvent was removed under reduced pressure and the residue was treated with water and extracted with methylene chloride. Work up of the extracts afforded 21-acetoxy-9,11β-epoxy-17α-hydroxy-15,16β-methylene-pregn-4-en-3,20-dione, $\epsilon_{240} = 16300$.

EXAMPLE 4

A solution of 1.4 g. 21-acetoxy-9α-fluoro-11β, 17α-dihydroxy-15,16β-methylene-pregn-4-en-3,20-dione and 0.7 g. selenium dioxide in 120 ml. tert.-butanol was treated with 0.15 ml. pyridine and heated at reflux for 72 hours. The reaction solution was filtered, the filtrate was evaporated under reduced pressure and the residue was dissolved in ethyl acetate, washed with sodium bicarbonate solution and water and dried. The crude reaction product obtained by evaporation of the solvent was chromatographed on 50 g. of silica gel to afford 21-acetoxy-9α-fluoro-11β,17α-dihydroxy-15,16β-methylene-pregena-1,4-dien-3,20-dione, $\epsilon_{238} = 15,500$.

EXAMPLE 5

A solution of 5 g. 21-acetoxy-9β-fluoro-11βα17α-dihydroxy-15,16β-methylene-pregn-4-en-3,20-dione in 100 ml. absolute dioxane was treated with 10 ml. ethylorthoformate and 300 mg. p-toluene-sulfonic acid and kept at room temperature for 2 hours. Twelve ml. pyridine and 500 ml. ice-water was slowly added and the resulting mixture was extracted with methylene chloride. The extracts were washed with water until neutral, dried over sodium sulfate and evaporated under reduced pressure at 40°. The crude enolether thus obtained was dissolved in a mixture of 100 ml. acetone and 30 ml. ethanol and the solution was treated with 2 g. of anhydrous potassium acetate and then perchlorylfluoride was introduced over a period of three hours. After work-up of the reaction mixture, the crude reaction product (5.5 g.) was chromatographed on 500 g. silica gel. The first material to be eluted was 21-acetoxy-6β,9α-difluoro-11β,17α-dihydroxy-15,16β-methylene-pregn-4-en-3,20-dione, $\epsilon_{234} = 13300$. Continued elution afforded 21-acetoxy-6α,9α-difluoro-11β,17-dihydroxy-15,16β-methylene-pregn-4-en3,20-dione, $\epsilon_{236} = 16000$.

EXAMPLE 6

By analogy with example 1, 6α-fluoro-17α, 21-dihydroxy-15,16β-methylene-pregn-4ene-3,20-dione was hydroxylated to afford 6α-fluoro-11β,17α,21-trihydroxy-15,16β-methylene-pregn-4-ene-3,20-dione, $\epsilon_{238} = 16100$.

The starting material can be manufactured by the following method:

17α,21-dihydroxy-15,16β-methylene-pregn-4-en-3,20-dione was reacted with acetic anhydride/pyridine to afford 21-acetoxy-17α-hydroxy-15,16β-methylene-pregn-4-en-3,20-dione, mp. 237°–239° (acetone/hexane), $[α]_D^{25} + 127°$, $\epsilon_{241} = 17000$. A mixture of 18.8 g of 21-acetoxy-17-hydroxy-15,16β-methylene-pregn-4-ene-3,20-dione, 18.8 ml of ethyl orthoformate, 900 mg of p-toluene sulfuric acid, 1.0 ml of methanol and 900 ml of dioxane was kept at room temperature for 2 hours in the dark. The reaction mixture was poured onto ice cold sodium carbonate solution and extracted with methylene chloride. The extracts were washed with water, dried over sodium sulfate and evaporated under reduced pressure. The residue was dissolved in hexane-acetone (8 : 1) and filtered through 800 g. of silicagel. There was obtained 16.8 g. of cristalline 21acetoxy-17α-hydroxy-3-methoxy-15,16β-methylene-pregna-3,5-dien-20-one which was dissolved in 800 ml. of acetone and 800 ml. of dioxane. To this solution, a solution of 8,3 g. of potassium acetate in 250 ml. of ethanol was added at 0°. A moderate stream of perchloryl fluoride was introduced in the stirred reaction mixture over a period of 3 hours. Subsequently, argon was blown through the reaction mixture for 15 minutes in order to remove excess perchloryl fluoride. The reaction mixture was then poured into ice water and extracted with methylene chloride. The extract was washed with water until neutral, dried over sodium sulfate and evaporated under reduced pressure. The residue was chromatographed on silicagel. Elution with isopropyl ether-methanol (98 : 2) yielded 21-acetoxy-6β-fluoro-17α-hydroxy-15,16β-methylene-pregn-4-ene-3,20-dione of melting point 231°–233°, $\epsilon_{235} = 11800$.

Continued elution afforded pure 21-acetoxy-6α-fluoro-17α-hydroxy-15,16β-methylene-pregn-4-ene-3,20-dione of melting point 235°–236°, $\epsilon_{237} = 15200$.

1.0 g. of 21-acetoxy-6α-fluoro-17β-hydroxy-15,16β-methylene-pregn-4-ene-3,20-dione was dissolved in 100 ml. of methanol. 1.5 g. of sodium carbonate dissolved in 20 ml. of water was added and the mixture stirred for 4 hours under argon. The mixture was poured into brine and extracted with methylene chlorid. The organic extracts afforded 6α-fluoro-17β,21-dihydroxy-15,16β-methylene-pregn-4-ene-3,20-dione.

EXAMPLE 7

By analogy with Example 3, 17, 20; 20,21-bis(methylene-dioxy)-9,11β-epoxy-pregn-4-en-3-one was reacted with hydrogen fluoride afford 17,20; 20,21-bis(methylenedioxy)-9β-fluoro-11β-hydroxy-pregn-4-en-3-one.

0.85 g. of 9α-fluoro-11β-hydroxy-15,16β-methylene-17,20; 20,21-bis(miethylene-dioxy)pregn-4-en-3-one is heated in 80 ml. of 50 per cent acetic acid for 2 hours to 90°. The mixture was poured into ice water and extracted with ethyl acetate. The organic extracts were washed with sodium hydrogen carbonate solution and water, dried and evaporated. Chromatography of the residue on silicagel using methylene chloride-acetone (7 : 3) yielded pure 9α-fluoro-11β,17α,21-trihydroxy-15,16β-methylene-pregn-4-ene-3,20-dione, $\epsilon_{240} = 16300$.

The starting material can be prepared by the following method

A solution of 1 g. of 11β,17α,21-trihydroxy-15,16β-methylene-pregn-4-en-3,20-dione in 50 ml. of chloroform was treated with a mixture of 20 ml. of 37 percent aqueous formaldehyde solution and 20 ml. of concentrated hydrochloric acid and stirred at room temperature for one hour. The organic phase was worked up and the residue was chromatographed on silica gel. There was obtained 15,16β-methylene-17,20,20,21-bis(methylenedioxy)-11β-hydroxy-pregn-4-en-3one, $\epsilon_{240} = 16500$.

Three hundred seventh-five milligrams of the bis-methylenedioxy compound thus prepared was heated to 100° for two hours with 5 ml. of dimethylformamide, 0.25 ml. of pyridine and 0.2 ml. of methane sulfonylchloride. The reaction mixture was poured into cold sodium bicarbonate solution and the solution was extracted with methylenechloride/ether. Work up of the organic extract afforded a crude product which was chromatographed on silica gel. In this manner there was obtained 15,16β-methylene-17,20;20,21-bis(methylenedioxy)-pregna-4,9(11)-dien3-one, $\epsilon_{239} = 17000$.

3.0 Milliliters of 0.5 N perchloric acid were added to a solution of 4.0 g. of 15,16β-methylene-17,20;20,21-bis(methylene-dioxy)-pregna-4,9(11)-dien-3-one in 80 ml. of dioxane and the solution was treated within 30 minutes with 1.65 g. of N-bromoacetamide in three portions. It was stirred (additional five hours)and then poured into 200 ml. of a 5 percent sodium bisulfite solution. The product was extracted with methylene chloride and the extract worked up. There was obtained 9α-bromo-11β-hydroxy-15,16β-methylene-17,20;20,21-bis(methylenedioxy)-pregn- 4-en-3-one which can be used directly for the next step.

The bromohydrin thus obtained was dissolved in 300 ml. acetone and heated at reflux for 7 hours with 8 g. anhydrous sodium acetate. The acetone was removed, the residue treated with water and extracted with methylene chloride. There was obtained 17,20;20,21-bis(methylenedioxy)-9,11β-epoxy-15,16β-methylene-pregn-4-en-3-one, $\epsilon_{239} = 16400$.

EXAMPLE 8

To a solution of 3.0 g. of 17α,21-diacetoxy-11β-hydroxy-15,16β-methylene-pregn-4-ene-3,20-dione in 30 ml. of pyridine was added a mixture of 3.1 g. of chromium trioxide and 30 ml. of pyridine. The reaction mixture was kept at room temperature for 20 hours, then poured into ice water and extracted with ethyl acetate. The organic extract was worked up in the usual manner and afforded pure 17α,21-diacetoxy-15,16β-methylene-pregn-4-ene-3,11,20-trione, $\epsilon_{240} = 16100$.

We claim:
1. Compounds of the formula

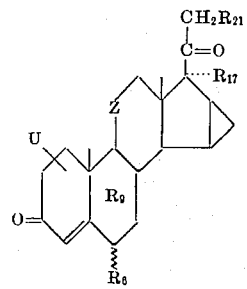

I wherein $R_6$ and $R_9$ are independently hydrogen, fluorine, chlorine or bromine; $R_{17}$ and $R_{21}$ are independently hydroxy or lower acyloxy; Z is carbonyl or β-hydroxymethylene and U is a single or double bond between C—1 and C—2.

2. The compounds of claim 1 wherein $R_6$ and $R_9$ are hydrogen or fluorine, $R_{17}$ and $R_{21}$ are hydroxy or acetoxy and Z is a β-hydroxymethylene.

3. The compound of claim 2 which is 11β,17α,21-trihydroxy-15,16β-methylene-pregn-4-en-3,20-dione.

4. The compound of claim 2 which 11β,17α,21-trihydroxy-15,16β-methylene-pregna-1,4-dien-3,20-dione.

5. The compound of claim 2 which 21-acetoxy-11β,17α-dihydroxy-15,16β-methylene-pregn-4-en-3,20-dione.

6. The compound of claim 2 which is 21-acetoxy-9α-fluoro-11β,17α-dihydroxy-15,16β-methylene-pregn-4-en-3,20-dione.

7. The compound of claim 2 which is 21-acetoxy-9α-fluoro-11β,17α-dihydroxy-15,16β-methylene-pregna-1,4-dien-3,20-dione.

8. The compound of claim 2 which is 21-acetoxy-6α,9α-difluoro-11β,17α-dihydroxy-15,16β-methylene-pregn-4-3,20-dione.

9. The compound of claim 2 which is 21-acetoxy-6β,9α-di-fluoro-11β,17α-dihydroxy-15,16β-methylene-pregn-4-en-3,20-dione.

10. The compound of claim 2 which is 6α-fluoro-11β,17α,21-trihydroxy 15,16β-methylene-pregn-4-ene-3,20-dione.

11. The compound of claim 2 which is 9α-fluoro-11β,17α,21-trihydroxy-15,16β.methylene-pregn-4-ene-3,20-dione.

12. The compound of claim 1 which is 17α,21-diacetoxy-15,16β-methylene-pregn-4-ene-3,11,20-trione.

* * * * *